(12) United States Patent
Hara

(10) Patent No.: US 7,865,946 B2
(45) Date of Patent: Jan. 4, 2011

(54) DATA TRANSMISSION CONTROLLING METHOD AND DATA TRANSMISSION SYSTEM

(75) Inventor: Kazuhiro Hara, Kanagawa (JP)

(73) Assignee: Sony Corporation, Tokyo (JP)

( * ) Notice: Subject to any disclaimer, the term of this patent is extended or adjusted under 35 U.S.C. 154(b) by 746 days.

(21) Appl. No.: 10/824,985

(22) Filed: Apr. 15, 2004

(65) Prior Publication Data

US 2004/0202328 A1 Oct. 14, 2004

Related U.S. Application Data

(63) Continuation of application No. 09/309,412, filed on May 10, 1999, now Pat. No. 7,519,811.

(30) Foreign Application Priority Data

May 12, 1998 (JP) ................................. 10-129214

(51) Int. Cl.
*H04L 29/06* (2006.01)
*G06F 15/16* (2006.01)
(52) U.S. Cl. ...................... 726/14; 713/160; 709/230
(58) Field of Classification Search ................ 380/217, 380/239; 713/151; 726/14
See application file for complete search history.

(56) References Cited

U.S. PATENT DOCUMENTS

| 4,503,287 A | 3/1985 | Morris et al. |
| 4,535,355 A | 8/1985 | Arn et al. |
| 4,649,233 A | 3/1987 | Bass et al. |
| 4,829,569 A * | 5/1989 | Seth-Smith et al. ......... 380/234 |
| 5,524,116 A * | 6/1996 | Kalmanek et al. ........... 714/799 |
| 5,548,646 A | 8/1996 | Aziz et al. |
| 5,602,917 A * | 2/1997 | Mueller ...................... 380/284 |

(Continued)

FOREIGN PATENT DOCUMENTS

EP 0 179 612 4/1986

(Continued)

OTHER PUBLICATIONS

R. Atkinson. RFC 1825: Security Architecture for the Internet Protocol. Aug. 1995. p. 1-21 (obtained from http://www.rfcarchive.org).*

(Continued)

*Primary Examiner*—Christian LaForgia
(74) *Attorney, Agent, or Firm*—Frommer Lawrence & Haug LLP; William S. Frommer; Ellen Marcie Emas

(57) ABSTRACT

Disclosed herein is a data transmission system permitting secure and more reliable transmission of data from a data transmitter to a data receiver or receivers. The system comprises: a data transmitter for encrypting data and transmitting the encrypted data; data receivers for receiving the encrypted data from the data transmitter; satellite links used for data transmission from the data transmitter to the data receivers; and bidirectional communication channels which are also used for transmitting data from the data receivers to the data transmitter and which have a smaller capacity of data transmission than the satellite links. The satellite links are used to transmit encrypted data from the data transmitter to the data receivers. At least the bidirectional communication channels are used to communicate restrictive data transmission control information between the data transmitter and the data receivers.

20 Claims, 14 Drawing Sheets

U.S. PATENT DOCUMENTS

| | | | |
|---|---|---|---|
| 5,652,795 A | | 7/1997 | Dillon et al. |
| 5,970,059 A | * | 10/1999 | Ahopelto et al. ............ 370/338 |
| 5,983,350 A | * | 11/1999 | Minear et al. ................ 726/11 |
| 5,987,518 A | * | 11/1999 | Gotwald .................... 709/230 |
| 6,021,307 A | | 2/2000 | Chan |
| 6,055,236 A | * | 4/2000 | Nessett et al. ............... 370/389 |
| 6,098,188 A | * | 8/2000 | Kalmanek et al. .......... 714/746 |
| 6,163,843 A | * | 12/2000 | Inoue et al. ................... 726/11 |
| 6,167,513 A | * | 12/2000 | Inoue et al. ................. 713/150 |
| 6,178,244 B1 | * | 1/2001 | Takeda et al. ............... 380/277 |
| 6,226,771 B1 | * | 5/2001 | Hilla et al. .................. 714/758 |
| 6,266,335 B1 | * | 7/2001 | Bhaskaran .................. 370/399 |
| 6,385,647 B1 | * | 5/2002 | Willis et al. ................. 709/217 |
| 6,522,651 B2 | * | 2/2003 | Herrmann ................. 370/395.2 |
| 6,781,991 B1 | * | 8/2004 | Anderlind .................. 370/394 |
| 6,795,917 B1 | * | 9/2004 | Ylonen ....................... 713/160 |
| 7,028,335 B1 | * | 4/2006 | Borella et al. ................ 726/11 |
| 7,032,242 B1 | * | 4/2006 | Grabelsky et al. ............ 726/11 |
| 7,100,020 B1 | * | 8/2006 | Brightman et al. ........... 712/18 |
| 2002/0003811 A1 | * | 1/2002 | Herrmann .................. 370/474 |

FOREIGN PATENT DOCUMENTS

| | | |
|---|---|---|
| JP | 1 181349 | 7/1989 |
| JP | 06-069962 | 3/1994 |
| JP | 7 202877 | 8/1995 |
| JP | 7 327029 | 12/1995 |
| JP | 8 214283 | 8/1996 |
| JP | 08-242438 | 9/1996 |
| JP | 8 288940 | 11/1996 |
| JP | 08-340541 | 12/1996 |
| JP | 09-168006 | 6/1997 |
| JP | 09-212090 | 8/1997 |
| JP | 09-252320 | 9/1997 |
| JP | 10 79730 | 3/1998 |
| JP | 10 117173 | 5/1998 |
| WO | WO 97 00443 | 1/1997 |
| WO | WO 97 50249 | 12/1997 |
| WO | WO 98/18289 | 4/1998 |
| WO | WO 99/35799 * | 7/1999 |

OTHER PUBLICATIONS

R. Atkinson. RFC 1826: IP Authentication Header. Aug. 1995. p. 1-13 (obtained from http://www.rfc-archive.org).*

R. Atkinson. RFC 1827: IP Encapsulating Security Payload (ESP). Aug. 1995. p. 1-12 (obtained from http://www.rfcarchive.org).*

S. Kent et al. FRC 2402: IP Authentication Header. Nov. 1998. p. 1-21 (obtained from http://www.rfc-archive.org).*

S. Kent et al. RFC 2406: IP Encapsulating Security Payload (ESP). Nov. 1998. p. 1-21.*

Japanese Office Action dated Apr. 6, 2010 (Corresponding Patent Application JP 2006-327507).

Japanese Office Action dated Apr. 6, 2010 (Corresponding Patent Application JP 2006-327506).

J. Joosten and C. Piney "CERN's Approach to MAC-Level bridging of LANs", publication date Jun. 1987.

* cited by examiner

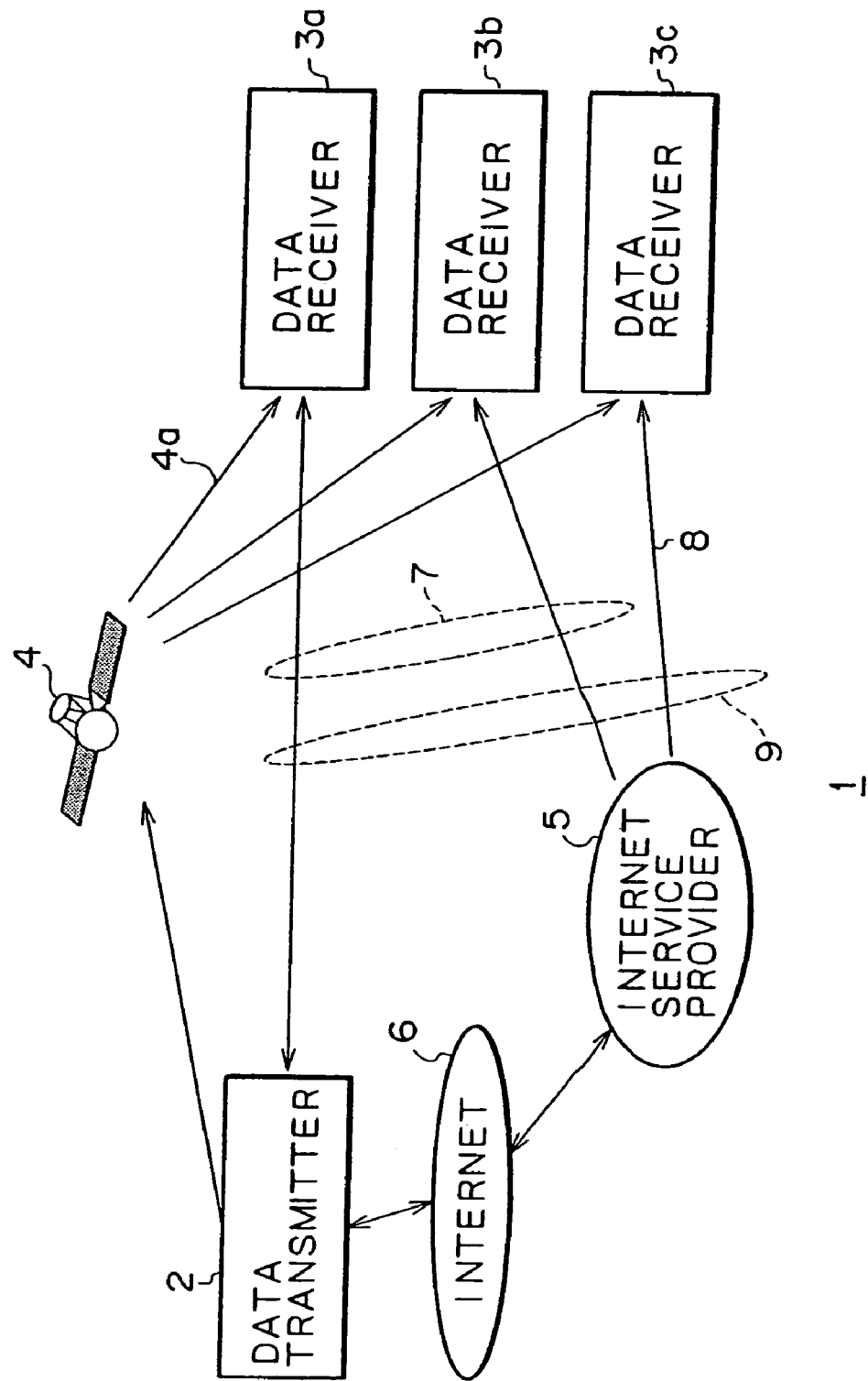

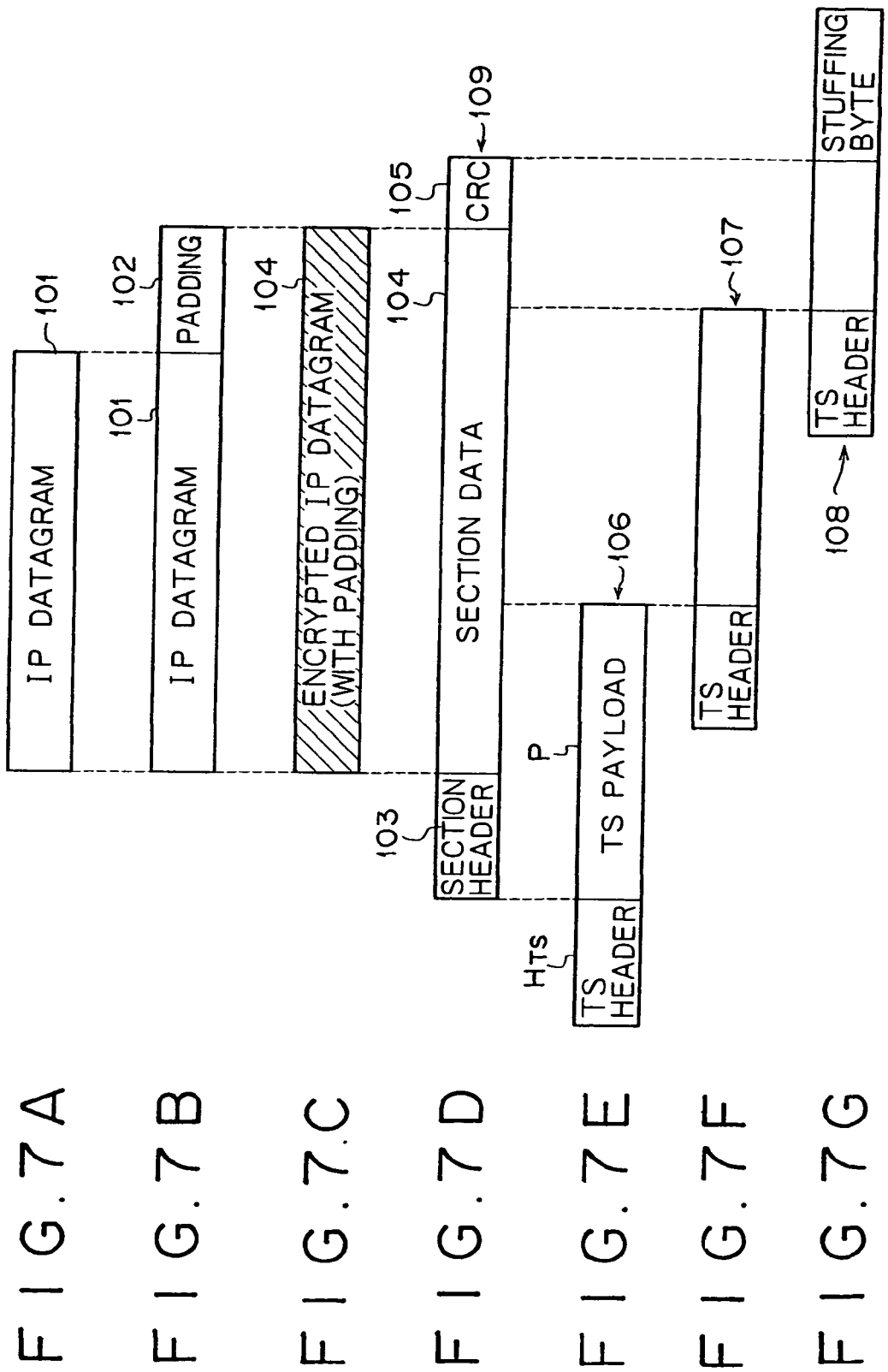

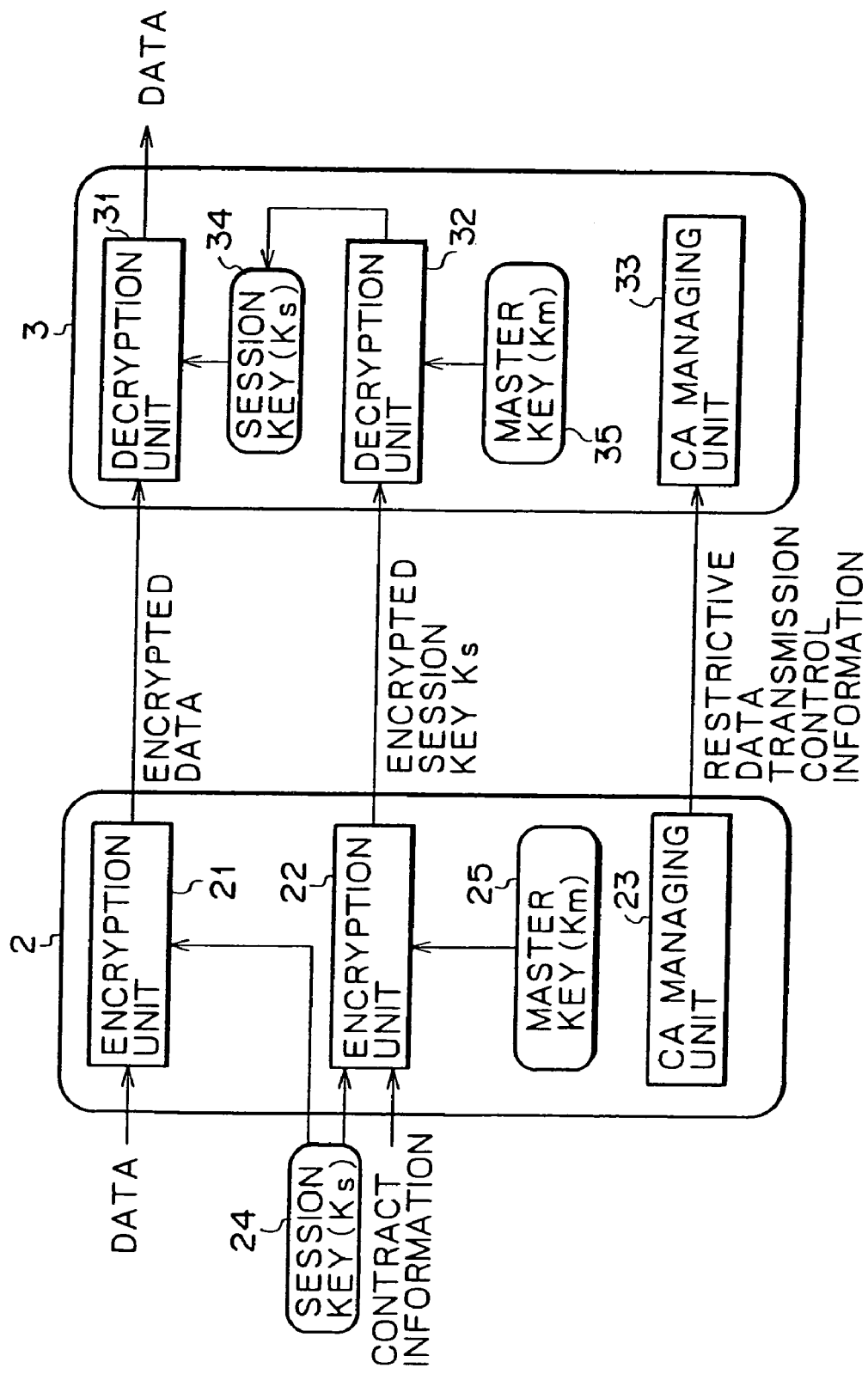

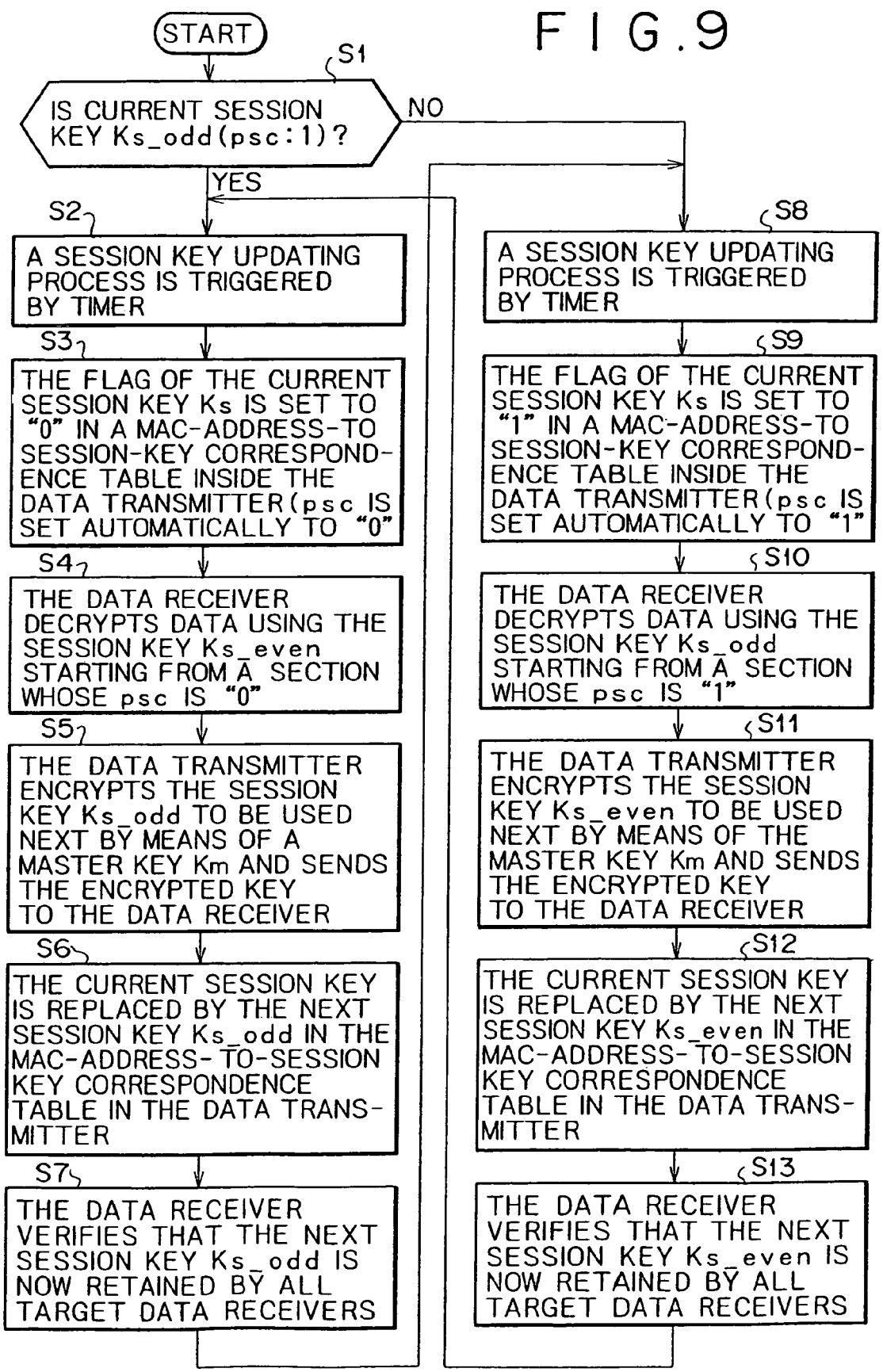

FIG. 10

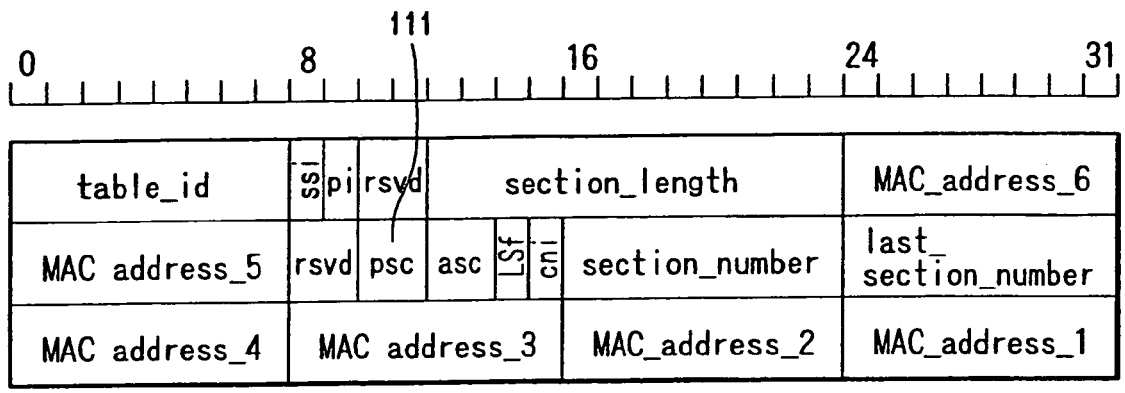

| table_id | ssi | pi | rsvd | section_length | MAC_address_6 |
| MAC address_5 | rsvd | psc | asc | LSf | cni | section_number | last_section_number |
| MAC address_4 | MAC address_3 | MAC_address_2 | MAC_address_1 | ssi : section_syntax_indicator
pi : private_indicator
rsvd : reserved
psc : payload_scramble_indicator
asc : address_scramble_indicator
LSf : LLC_SNAP_flag
cni : current_next_indicator

FIG. 11

| MAC ADDRESS | Ks_even | Ks_odd | Ks FLAG |
|---|---|---|---|
| 08:00:46:01:07:24 | 0×C08F...25 | 0×90B3...AF | 0 |
| 08:00:45:01:07:09 | 0×26D2...61 | 0×BA02...3C | 1 |
| 01:00:5e:16:0:0 | 0×461E...67 | 0×DC1A...22 | 0 |

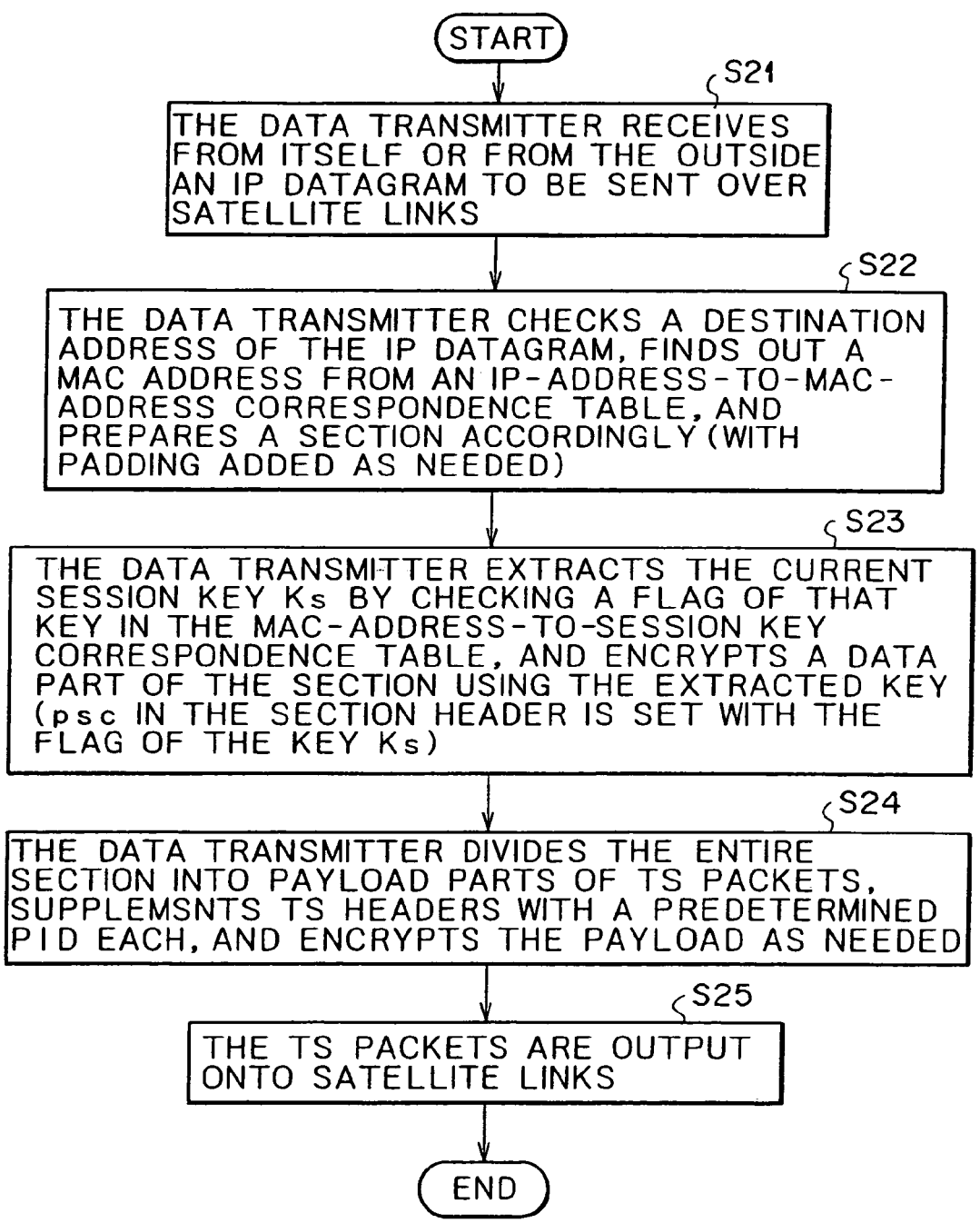

FIG. 13

| IP ADDRESS   | bitmask         | MAC address       |
|--------------|-----------------|-------------------|
| 133.11.9.39  | 255.255.255.225 | 08:00:46:01:07:24 |
| 133.11.20.0  | 255.255.255.0   | 08:00:46:01:07:09 |
| 226.0.0.0    | 255.255.255.224 | 01:00:5e:16:0:0   |

FIG. 15

| MAC ADDRESS       | Ks_even     | Ks_odd      |
|-------------------|-------------|-------------|
| 08:00:46:01:07:24 | 0×C08F...25 | 0×90B3...AF |
| 01:00:5e:16:0:0   | 0×461E...67 | 0×DC1A...22 |

| VERS | HLEN | SERVIE TYPE | TOTAL LENGTH | |
|---|---|---|---|---|
| IDENTIFICAION | | | FLAGS | FRAGMENT OFFSET |
| TIME TO LIVE | PROTOCOL | | HEADER CHECKSUM | |
| SOURCE IP ADDRESS | | | | |
| DESTINATION IP ADDRESS | | | | |
| IP OPTIONS (IF ANY) | | | | PADDING |
| DATA | | | | |
| ..... | | | | |

DATA TRANSMISSION CONTROLLING METHOD AND DATA TRANSMISSION SYSTEM

CROSS REFERENCE TO RELATED APPLICATIONS

This application is a continuation of application Ser. No. 09/309,412, filed May 10, 1999, now U.S. Pat. No. 7,519,811.

BACKGROUND OF THE INVENTION

1. Field of the Invention

The present invention relates to a data transmission controlling method and a data transmission system for controlling transmission of data from a data transmitter to a data receiver. More particularly, the invention relates to a data transmission controlling method and a data transmission system for limiting the reception of transmitted data from a data transmitter to a specific data receiver.

2. Description of the Related Art

In recent years, network type data transmission systems which allow a data transmitter to transmit data to a plurality of remotely located data receivers have been established. For example, satellite television broadcasting is implemented as a broadcast data transmission system utilizing satellite links to distribute video and audio information to a plurality of data receivers.

Another example of the broadcast data transmission system is the Ethernet that is set up as a local area network (LAN). As shown in FIG. 1, an Ethernet network is typically constituted by a data transmitter 351 for transmitting data and by data receivers 352a and 352b for receiving data from the data transmitter 351 over a network 353. A maximum allowable distance between data receivers on the Ethernet is set for several kilometers.

Where it is desired for the data transmitter 351 in the above data transmission system to transmit data to the data receiver 352a, the data transmitter 351 places the data onto the network 353. The transmitted data are supplemented with a destination address identifying the destination data receiver 352a. Illustratively, 48 bits are used to express a large volume of destination address information.

The data placed by the data transmitter 351 onto the network 353 are received by the data receivers 352a and 352b alike. Each data receiver references the destination address attached to the received data to see if the address corresponds to its own address. A typical frame format used by the Ethernet is structured as shown in FIG. 2. In this format, a destination address part 401 designates the address of the destination data receiver that should receive the data.

If a given data receiver judges that the received address is not its own, the receiver discards the transmitted data. That is, the data receiver 352a judging the address attached to the data to be its own accepts the transmitted data, while the data receiver 352a failing to detect its own address in the received data discards the data. On the Ethernet, a data receiving process by a data receiver typically proceeds as shown in the steps constituting a flowchart of FIG. 3.

In step S101, the data receiver receives an Ethernet frame containing data from a local area network. In step S102, the data receiver extracts a destination address from the received Ethernet frame. In step S103, the data receiver checks to see if the destination address is its own address (unicast address) or an address to which it belongs (multicast address). If the destination address turns out to be the data receiver's own address (unicast address) or an address to which it belongs (multicast address), the data receiver transmits the Ethernet frame to a host computer. A unicast address signifies an address destined for an individual receiver, and a multicast address is an address allowing a plurality of data receivers (e.g., a data receiver group) to receive the data transmitted in conjunction with the address.

If the destination address turns out to be neither the address destined for the data receiver in question (unicast address) nor an address to which the data receiver belongs (multicast address), then the data receiver discards the Ethernet frame.

According to the above method of data transmission based on the destination address scheme, any data receiver whose address does not match a transmitted destination address is supposedly incapable of receiving the data furnished with the address. With that data transmission method in effect, however, a data receiver may have its address and its judging feature modified unscrupulously so as to accept otherwise destined data, i.e., data without the destination address identifying the data receiver in question. Such a possibility poses a security problem when confidential data need to be transmitted to a specific data receiver.

Over the Ethernet, the number of data receivers connected to the same network is limited, and so are the distances between the connected receivers. That means there is only a limited possibility that data sent to one data receiver may be tapped illicitly by another data receiver. Illustratively, under a typical Ethernet scheme of 10BASE-5, the maximum length of cables for one segment is limited to 500 meters and the number of transceivers (data transmitter-receivers) connectable to the network is set for up to 100.

Meanwhile, if a data transmission network is structured using satellite links, one network can cover an area wider than the whole country such as Japan. On such a network, data transmitted to a data receiver on the northernmost island of Hokkaido can be tapped by a data receiver in the southernmost Okinawa Prefecture. That is, on any satellite link-based network to which a large number of data receivers are configured, there is an increased possibility of data being illicitly tapped by unintended parties.

In a data transmission setup utilizing broadcast type communication channels such as satellite links, untreated data can be received not only by the intended data receiver but also by those not supposed to receive the data in question. One solution to this problem with today's digital data broadcasting systems using a communication satellite is the encryption of data (i.e., primarily video and audio information) prior to their transmission over satellite communication links. Data receivers, for their part, have a decrypting function to reconstitute the original data. In that type of data transmission system, only those data receivers authorized beforehand to receive data can decrypt the transmissions for audio-visual consumption. One such system is based on Report No. 74 by the Telecommunications Technology Council (Japan). As its transmission format, the system utilizes MPEG2 (Moving Picture Experts Group Phase 2) transport stream packets (TS packets). Illustratively, the system has its data transmitter encrypt data using encryption keys and has its data receivers decrypt the encrypted data using decryption keys corresponding to the encryption keys. The format of the TS packet is shown in FIG. 4. A PID (packet identification) part 411 and a scramble control part 412 in the header of the format determine encryption keys. Typically, the encryption keys include a session key Ks and a work key Kw. The PID part 411 makes up 13-bit data and the scramble control part 412 constitutes two-bit data.

A data transmission system in the existing satellite television broadcast setup transmitting data in the TS packet typically comprises a data transmitter 501 and a data receiver 511 as depicted in FIG. 5. The data transmitter 501 has encryption units 502, 503 and 504 that carry out data encryption using various encryption keys. The data receiver 511 has decryption units 512, 513 and 514 that perform data decryption using various decryption keys, and an authorization judging unit 515.

In the data transmission system of the above structure, the data transmitter 501 first transmits a work key Kw 506 to the data receiver 511. Specifically, the data transmitter 501 prepares in advance the work key Kw 506 corresponding to the PID part 411 and scramble control part 412. The data transmitter 501 then gets the work key Kw 506 encrypted by the encryption unit 504 using a master key Km 507. The encrypted work key Kw 506 is transmitted to the data receiver 511. The master key Km 507 is identical to a master key (decryption key) Km 518 specific to the data receiver 511. The encrypted work key Kw 506 is transmitted from the data transmitter 501 to the data receiver 511 over a satellite link.

On receiving the work key Kw 506 encrypted with the master key Km 507, the data receiver 511 decrypts the received key using its own master key Km 518. The decrypted work key Kw 517 is preserved by the data receiver 511 in correspondence with the PID part. The work key Kw 517 is used to decrypt encrypted data coming from the data transmitter 501.

Upon data transmission from the data transmitter 501 to the data receiver 511, the data transmitter 501 has a payload part 413 of data in the TS packet encrypted by the encryption unit 502 using a session key Ks 505. At the same time, the session key Ks 505 is encrypted by the encryption unit 503 using the work key Kw 506.

Upon receipt of the TS packet with its PID part identifying the data receiver 511 as the destination, the data receiver 511 extracts the previously preserved work key Kw 517 based on the PID part 411 in the transmitted TS packet. Using the extracted work key Kw 517, the data receiver 511 decrypts the encrypted session key Ks 505 transmitted together with the data from the data transmitter 501. By use of the session Ks 516 key thus decrypted, the data receiver 511 decrypts the payload part 413 in the TS packet to extract the data therefrom.

Unauthorized data receivers do not possess the appropriate work key Kw corresponding to the PID part of interest because the work key Kw has not been sent to these data receivers. Such data receivers are incapable of decrypting the session key Ks that the data transmitter 501 has transmitted following key encryption using the work key Kw. With the session key Ks not decrypted, the unauthorized data receivers cannot decrypt the encrypted data from the data transmitter 501. In other words, the unapproved data receivers can receive encrypted data but cannot decrypt the data for audio-visual consumption.

The above broadcasting system utilizing satellite links typically implements restrictive data transmission control as described. Various other methods of restrictive data transmission control are also practiced not only by broadcasting systems but also over, say, the Internet.

On the Internet, PGP (Pretty Good Privacy) and PEM (Privacy Enhanced Mail) are illustratively used to encrypt electronic mail against eavesdropping or falsification by unscrupulous parties. Also employed on the Internet is SSL (Secure Socket Layer) designed to forestall illicit tapping of credit card numbers transferred in electronic commerce based on HTTP (Hyper Text Transfer Protocol). These schemes are characterized by the use of an encryption system or by the adoption of flexible data transmission controls.

There exist more generalized data transmission control methods targeted for IP (Internet Protocol) datagrams. Standardized methods of this kind include AH (Authentication Header) and ESP (Encapsulating Security Payload) generically called IPSEC.

The following problems have been generally experienced in connection with television broadcasts utilizing satellite links:

A first problem is the limited number of authorized data receivers. As shown in FIG. 4, the PID part and the scramble control part for identifying encryption keys comprise only 13 bits and two bits respectively. That means 15 bits are employed to specify only up to $2^{15}$ (=32,768) data receivers.

A second problem is the increase in costs on the transmitting side in keeping with a growing number of PIDs in use. Illustratively, data receivers need as many MPE2 encoders as are approximately proportional to the number of PIDs. Thus along with an increased PID count have come increased costs on the data transmitter side that requires installing large-scale facilities.

A third problem is the inability of the data transmitter in one-way data transmission over satellite links to know whether information has been correctly transmitted to destination data receivers. For example, there may be cases where, without the knowledge of the data transmitter, data receivers cannot actually receive data therefrom despite their authorized status. However, attempts to transmit information more reliably to data receivers take time. This can involve wasteful consumption of a lot of resources, which causes the reliable yet time-consuming scheme to become an impediment to flexible data transmission control.

A fourth problem concerns a poor affinity with the Internet Protocol when an IP datagram must be transmitted with its PID adjusted to an IP destination address by the data transmitter. More specifically, the destination address of an IP datagram has a 32-bit address format that is difficult to adjust with respect to the 13-bit PID part. Furthermore, the above method currently used on the Internet has a fifth problem: PGP, PEM and SSL are application-specific data transmission controls and are not common to all applications on the Internet. The need for each application to be provided with its own controlling method makes prompt handling of newly introduced applications difficult.

A sixth problem is that while the authentication header and encapsulating security payload are application-independent, there are virtually no network devices compatible with these methods at the level of the current version of the Internet Protocol (e.g., IP v4). While the next version of the Internet Protocol (e.g., IP v6) allows AH and ESP to be used on the Internet in standardized fashion, they are considered practically unusable over the existing Internet.

SUMMARY OF THE INVENTION

The present invention provides a data transmission controlling method and a data transmission system whereby data transmission from a data transmitter to data receivers is carried out in a more secure and a more reliable manner than before.

In carrying out the invention and according to one aspect thereof, there is provided a data transmission controlling method comprising the steps of: transmitting data encrypted by data transmitting means to data receiving means over a first communication channel provided for data transmission from the data transmitting means to the data receiving means; and transmitting to the data receiving means restrictive data transmission control information for causing the encrypted data from the data transmitting means to be received solely by specific data receiving means at least over a second communication channel which, having a smaller capacity of data transmission than the first communication channel, is also used for data transmission from the data receiving means to the data transmitting means.

With this data transmission controlling method in use, the data transmitting means transmits data over the first communication channel to the data receiving means. Restrictive data transmission control information may be exchanged at least over the second communication channel between the data transmitting means and the data receiving means.

By the inventive data transmission controlling method above, the data transmitting means may transmit data including restrictive data transmission control information to the data receiving means over the first and the second communication channel. Over the second communication channel, information about data exchanges between the data transmitting means and specific data receiving means may be sent therebetween.

Illustratively, the inventive method above allows the data transmitting means to know whether the data sent to specific data receiving means have been correctly received thereby.

According to another aspect of the invention, there is provided a data transmission system comprising: a first communication channel used for data transmission from data transmitting means to data receiving means; and a second communication channel permitting bidirectional communication between the data transmitting means and the data receiving means; wherein the first communication channel is used to transmit encrypted data from the data transmitting means to the data receiving means; and wherein at least the second communication channel is used to transmit restrictive data transmission control information for causing the encrypted data from the data transmitting means to be received solely by specific data receiving means.

In the data transmission system of the above structure, the data transmitting means transmits data over the first communication channel to the data receiving means. Restrictive data transmission control information is exchanged over the second communication channel between the data transmitting means and the data receiving means, the second communication channel being at least used for data transmission from the data transmitting means to the data receiving means and having a smaller capacity of data transmission than the first communication channel.

In the inventive data transmission system above, the data transmitting means may transmit data including restrictive data transmission control information to, the data receiving means over the first and the second communication channel. Over the second communication channel, information about data exchanges between the data transmitting means and specific data receiving means may be transmitted therebetween.

Illustratively, the inventive system above allows the data transmitting means to know whether the information sent to specific data receiving means have been correctly received thereby.

According to a further aspect of the invention, there is provided a data transmission controlling method comprising the steps of: encapsulating data to be transmitted from data transmitting means to data receiving means in multiplexed fashion in accordance with a plurality of protocols; and encrypting at least one of data capsules resulting from the encapsulation.

With the above data transmission controlling method in use, data to be transmitted from the data transmitting means to the data receiving means are encapsulated in multiplexed fashion in keeping with a plurality of protocols.

The inventive method above allows data to be transmitted with related protocol requirements kept intact. That means data may be transmitted while retaining their compatibility with specific protocols. When data are encapsulated in keeping with a protocol to secure a space in which to store the data in question, there is provided a data space in which to accommodate various kinds of information. Encrypting the encapsulated data ensures further security.

Illustratively, data may be encapsulated in accordance with a protocol that can accommodate specific data. The encapsulating process provides a sufficient space to store information such as encryption keys about destination addresses. The destination address information is substantially increased compared with the conventional TS packet scheme under which the address information is written to the PID part and the scramble control part. This eliminates the need for expanding the PID part.

In addition, there is no need for each application to be provided with its own controlling method. This means that newly introduced applications are promptly dealt with by the inventive method. Furthermore, the authentication header (AH) and the encapsulating security payload (ESP) are allowed to be used on the existing Internet.

According to an even further aspect of the invention, there is provided a data transmission controlling method comprising the steps of: encrypting data using an encryption key; supplementing the encrypted data with encryption key information about the encryption key used to encrypt the data in question; transmitting the encrypted data together with the encryption key information from data transmitting means to data receiving means; and decrypting the encrypted data using one of a plurality of decryption keys which allow the data receiving means to decrypt the encrypted data and which are updated frequently, that one of the decryption keys being selected in accordance with the encryption key information attached to the encrypted data.

By the inventive method above, the data encrypted in the data encrypting step using the encryption key are furnished with encryption key information about the encryption key used to encrypt the data in question. In the data transmitting step, the encrypted data are transmitted together with the encryption key information from the data transmitting means to the data receiving means. In the data decrypting step, the encrypted data are decrypted by use of one of a plurality of decryption keys which allow the data receiving means to decrypt the encrypted data and which are updated frequently, that one of the decryption keys being selected in accordance with the encryption key information attached to the encrypted data.

By the inventive data transmission controlling method above, the data transmitting means encrypts data using an encryption key. The data receiving means decrypts the encrypted data received using one of a plurality of decryption keys which are frequently updated. That one decryption key is selected from among the multiple decryption keys by the data receiving means based on the encryption key information transmitted together with the encrypted data.

Other objects, features and advantages of the invention will become more apparent upon a reading of the following description an appended drawings.

BRIEF DESCRIPTION OF THE DRAWINGS

FIG. 6 is a schematic view of a data transmission system embodying the invention;

FIGS. 7A through 7G are schematic views of data which are to be transmitted from a data transmitter to a data receiver in the data transmission system and which are encapsulated in accordance with a plurality of protocols;

FIG. 8 is a block diagram of a data transmitter and a data receiver in the data transmission system;

FIG. 9 is a flowchart of steps in which to update a session key for encrypting data to be sent from the data transmitter to the data receiver;

FIG. 10 is a schematic view showing a data structure of a section header;

FIG. 11 is a correspondence table in which MAC addresses are set in correspondence with flags of session keys Ks;

FIG. 12 is a flowchart of steps in which the data transmitter encapsulates data;

FIG. 13 is a correspondence table in which IP addresses are set in correspondence with MAC addresses;

FIG. 15 is a correspondence table in which MAC addresses are set in correspondence with session keys Ks;

FIG. 16 is a schematic view depicting a data structure holding a TOTALLENGTH field used to extract an IP datagram;

DETAILED DESCRIPTION OF THE PREFERRED EMBODIMENTS

Figure 1:
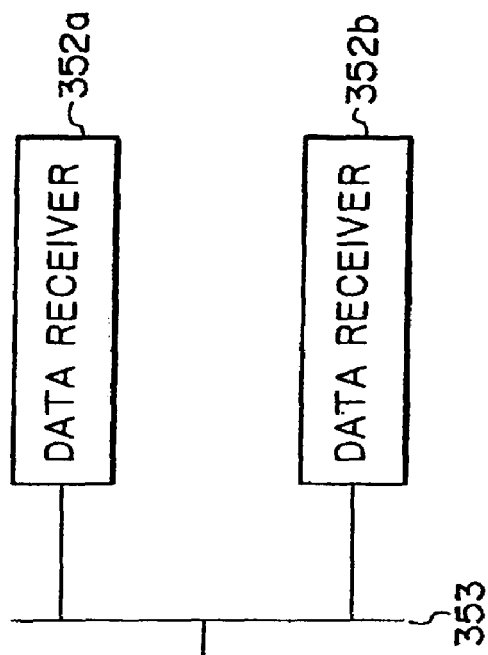
FIG. 1 is a schematic view sketching a typical structure of a conventional data transmission system.
Figure 2:
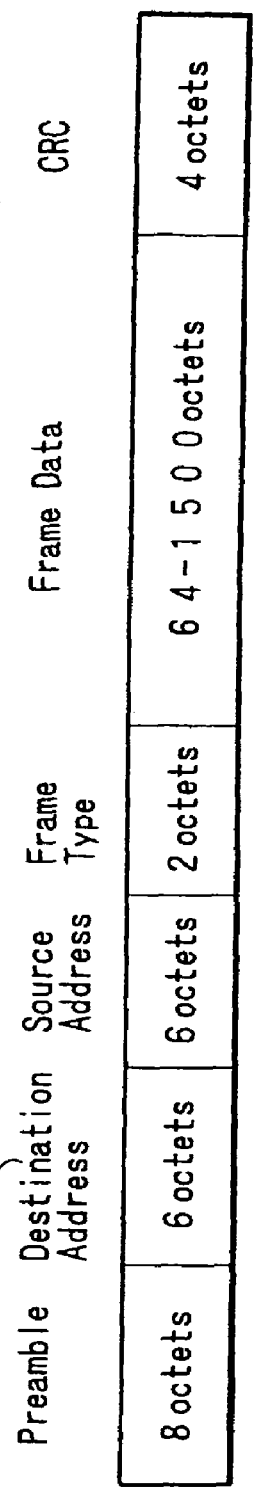
FIG. 2 is a schematic view illustrating a data structure of an Ethernet frame which is used by the conventional data transmission system in transmitting data and which contains a destination address.
Figure 3:
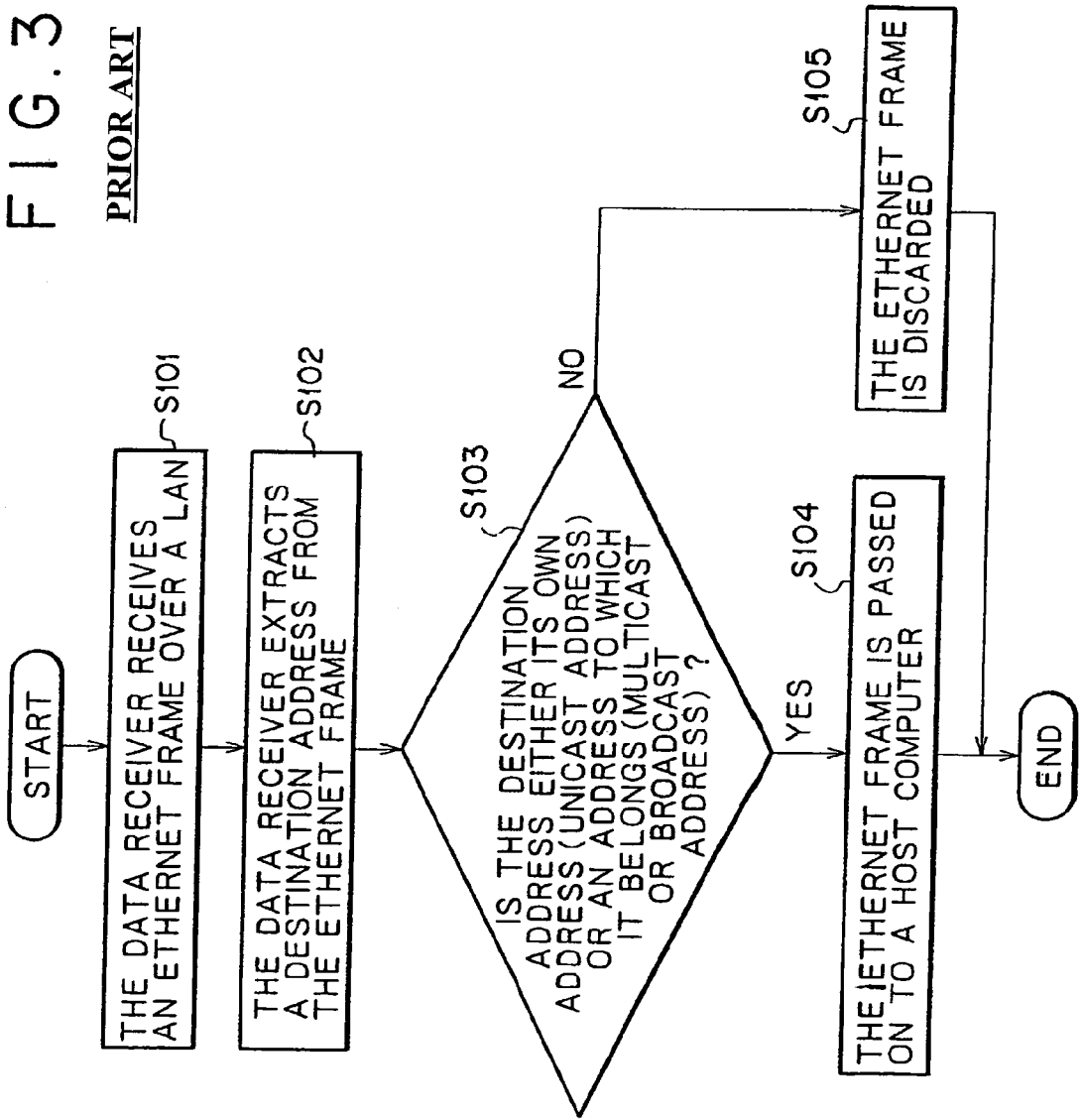
FIG. 3 is a flowchart of steps in which a data receiver of the conventional data transmission system checks to see if an Ethernet frame received over the Ethernet contains the receiver's own destination address and in which the data receiver performs processing subsequent to the destination address check.

Preferred embodiments of this invention will now be described in detail with reference to the accompanying drawings. A data transmission system shown below to embody the invention is one which limits to a specific data receiver the reception of data transmitted by a data transmitter over satellite links.

As depicted in FIG. 6, this inventive data transmission system controls transmission of data from a data transmitter 2 to data receivers 3a, 3b and 3c over satellite links 4a, leased lines 7 and telephone lines 8 serving as communication channels, as well as over bidirectional communication channels 9. In the system, the data transmitter 2 encrypts data and transmits the encrypted data over the communication channels to the data receivers 3a, 3b and 3c.

The data transmission system 1 includes the communication channels 4a which, by utilizing a communication satellite 4, act as a first communication channel allowing the data transmitter 2 to send data to the data receivers 3a, 3b and 3c; and the leased lines 7, telephone lines 8 and bidirectional communication channels 9 serving as a second communication channel providing bidirectional communication between the data transmitter 2 on one hand and the data receivers 3a, 3b and 3c on the other hand. The data transmission system 1 uses the first communication channel for transmission of encrypted data from the data transmitter 2 to the data receivers 3a, 3b and 3c, and employs the second communication channel for transmission of restrictive data transmission control information from the data transmitter to the data receivers. The data transmission system 1 is connected to the Internet.

The restrictive data transmission control information is information which allows a specific data receiver or receivers to receive data sent from the data transmitter 2. In other words, the restrictive data transmission control information authorizes a specific data receiver or receivers to receive the data of interest transmitted.

Using the above-described communication channels, the data transmitter 2 transmits various data to the data receivers 3a, 3b and 3c. The data receivers 3a, 3b and 3c receive the data coming over the communication channels. Although the setup of FIG. 6 shows only three data transmitters 3a, 3b and 3c, the data transmission system 1 may in practice comprise between hundreds and hundreds of thousands of data receivers.

What follows is a description of the communication channels permitting data exchanges between the data transmitter 2 and the data transmitters 3a, 3b and 3c (generically called the data transmitter 3 hereunder if there is no specific need to distinguish the individual data transmitters 3a, 3b and 3c from one another).

The satellite links 4a are unidirectional circuits on the Ku band having a bandwidth of about 30 Mbps. The satellite links 4a allow the data transmitter 2 to transmit data simultaneously to, say, data transmitters distributed all over Japan.

The bidirectional communication channels 9 are installed independently of the satellite links 4a between the data transmitter 2 and the data receiver 3. As their name implies, the bidirectional communication channels 9 permit bidirectional communication between the data transmitter 2 and the data receiver 3. As such, the bidirectional communication channels 9 are assumed hereunder to be general-purpose communication channels for use in communication over the Internet.

The leased lines 7 are communicating means directly connecting the data transmitter 2 with the data receiver 3.

The Internet 6 provides diverse kinds of information such as video and audio information. An Internet service provider 5 attaches the data receiver 3 communicatively to the Internet. The data transmitter 2 is assumed to be connected to the Internet 6.

The leased lines 7, telephone lines 8 and bidirectional communication channels 9 permitting data exchanges between the data transmitter 2 and the data receiver 3 have a smaller band capacity than the satellite links 4a. Generally, the lines 7, 8 and 9 provide a bandwidth of several to hundreds of Kbps.

The data transmission system 1 is also constituted as a so-called restrictive data receiving system allowing only a specific data receiver or receivers to receive data of interest. As such, the data transmission system 1 can transmit data to, say, the data receiver 3a alone (unicast data distribution), to a group of data receivers 3a and 3b only (multicast data distribution), or to all data receivers 3a, 3b and 3c (broadcast data distribution).

In the data transmission system 1, the data transmitter 2 sends data to the data receiver 3 as follows: the data to be transmitted from the data transmitter 2 to the data receiver 3 are encapsulated as shown in FIGS. 7A through 7G. Encapsulation is a process carried out by the data transmitter 2 transmitting the data of interest. In a first encapsulating step, the data to be sent to the data receiver 3 are encapsulated in accordance with a first protocol. In a second encapsulating step, the data encapsulated as per the first protocol are further encapsulated in accordance with a second protocol. The encapsulating process involves putting untreated data into capsules (i.e., packets or frames) formed based on a transmission format stipulated by a given communication protocol. With the data placed into such capsules, their transmission becomes controllable.

In the first encapsulating step, a capsule is formed by placing the whole target data to be sent to the data receiver 3 into a real data part equipped with an additional information part related to the real data part in question. The real data part in the capsule is encrypted. Below is a more detailed description of the first encapsulating step.

An IP (Internet Protocol) datagram 101 is composed of data based on the Internet Protocol as indicated in FIG. 7A. The data in the IP datagram 101 are destined for the data transmitter 3. A header of the IP datagram includes a destination address identifying the destination of the datagram on, say, the Internet.

The IP datagram 101 is not limited to being structured based on the Internet Protocol; it may be constituted alternatively in accordance with the Ethernet protocol.

As shown in FIGS. 7B through 7D, the data transmitter 2 encapsulates the data according to the first protocol mentioned above. Illustratively, Multiprotocol Encapsulation for DVB (Digital Video Broadcasting) may be adopted as the first protocol.

As shown in FIG. 7B, the data transmitter 2 performs data encapsulation in accordance with the first protocol first by padding the IP datagram (i.e., adding a padding part 102) to make the length of the data part an integer multiple of 64 bits. For example, a padding part of 0 to 63 bits is suffixed to the IP datagram 101. All bits in the padding part are "1" each. The padding is intended to keep the datagram to a predetermined data length because the data part is better suited for encryption when its length is an integer multiple of 64 bits. The data part placed in the format of the first protocol is called a section hereunder.

The section supplemented with the padding 102 is then encrypted by the data transmitter 2 as shown in FIG. 7C. Encryption is carried out by use of encryption keys. The encryption keys are session keys (described later) used to encrypt information to be sent to the data receiver 3. The encryption method adopted here is a block encryption method based on the common key cryptosystem such as the Triple-DES. The Triple-DES encryption is one of today's strongest public key cryptosystems and is easy to implement for high-speed encryption on a hardware basis. This encryption process, unlike that of most public key cryptosystems, is fast enough to keep up with transmission at rates of as high as 30 Mbps.

As indicated in FIG. 7D, the data transmitter 2 supplements an encrypted section data part 104 with a section header 103 and a tailer 105 for error detection.

The encrypted section data part 104 takes on a MAC (Media Access Control) frame structure. In the process of constituting a MAC frame, a MAC header is added to the data part. Referencing the MAC header facilitates control over destinations of data placed in the frame. Specifically, the MAC frame accommodates the destination address of the data receiver authorized to receive the data stored in the frame.

The section header 103 provides a data space wide enough to accommodate a 48-bit destination address. More specifically, the section header 103 has the MAC header formed therein to retain the destination address. Provision of the data space holding a 48-bit destination address in the section header 103 resolves the first problem mentioned earlier, i.e., the limited number of data receivers that may be configured. That is because the expanded address space accommodates a large quantity of information for identifying encryption keys. In addition, the fourth problem mentioned above regarding the poor affinity with the Internet Protocol is resolved because there is no need to adjust a packet ID (described later) of the IP datagram 101 with respect to an IP destination address at the time of datagram transmission.

The tailer 105 is coded for CRC (Cyclic Redundancy Checking). CRC is designed for the data receiver 3 receiving data in a MAC frame to verify whether the frame has been normally transmitted over satellite links. Illustratively, CRC involves coding in 32 bits.

Described so far has been the encapsulation of data to be transmitted in accordance with the first protocol. What follows is a description of how the data encapsulated as per the first protocol are further encapsulated in accordance with the second protocol.

Figure 4:
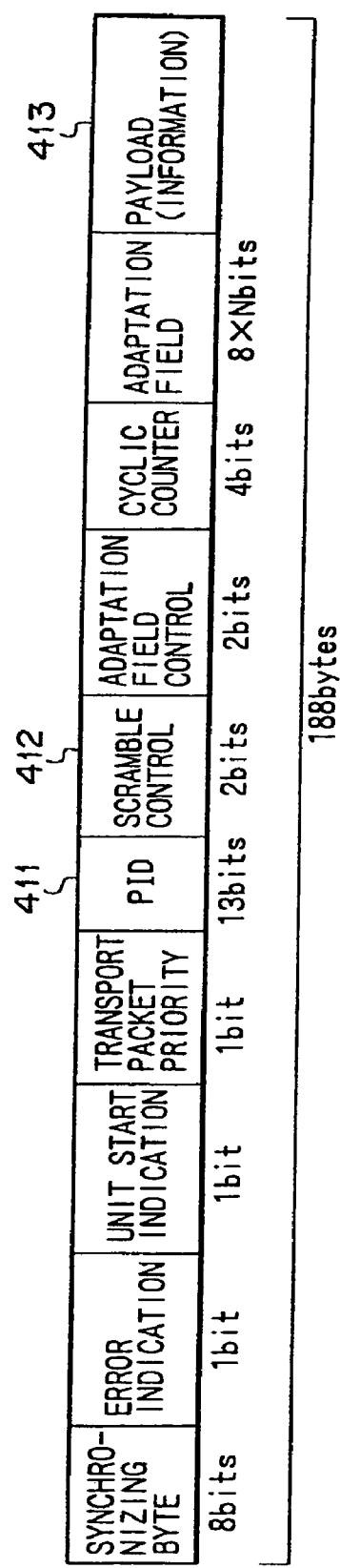
FIG. 4 is a schematic view of a data structure format for a TS packet.

Data encapsulation based on the second protocol involves dividing into a plurality of packets the data encapsulated according to the first protocol. The second protocol is a protocol that stipulates the encapsulation of data into TS (Transport Stream) packets based on MPEG2 (Moving Picture Experts Group Phase 2). The TS packets allow various kinds of data such as audio and video signals and other data to be multiplexed and transmitted over large-capacity digital lines. According to the second protocol, the data are encapsulated into a plurality of TS packets 106, 107 and 108 as shown in FIGS. 7E through 7G. The TS packets 106, 107 and 108 are each made up of a TS header HTS and a TS payload part P. The TS payload part P contains the data that have been divided and encapsulated in accordance with the first protocol. The TS header HTS of each TS packet is composed of a packet ID (PID) part and a scramble control part as depicted in FIG. 4. Conventionally, the fact that a destination address is written to the PID part and scramble control part has limited the scope of destination address information. This embodiment eliminates that disadvantage because the destination address is written to the section header 103.

The foregoing description has shown the encapsulation of data according to the second protocol. As described, the data transmitter 2 encapsulates the data to be sent to the data receiver 3 (IP datagram) in multiplexed fashion according to the first and the second protocol. The encapsulated data are forwarded to the communication satellite 4.

Because restrictive data transmission control is effected separately at two levels, i.e., at the TS packet level and at the section level, the second, the fifth and the sixth problems mentioned earlier are also resolved.

More specifically, a large amount of information is secured about encryption keys while the second problem is bypassed, i.e., soaring transmission costs in keeping with a growing number of PIDs in use.

The fifth problem, i.e., the need for each application to be provided with its own controlling method no longer applies. Newly introduced applications are promptly dealt with by the embodiment.

The sixth problem is also circumvented by the embodiment. That is, the authentication header (AH) and the encapsulating security payload (ESP) are allowed to be used on the existing Internet.

The encapsulation of IP datagrams described above applies when the datagrams are transmitted over satellite links 4a to the data receiver 3. Over the bidirectional communication channels 9, ordinary procedures of the Internet are used to transmit IP datagrams without recourse to the specialized encapsulation.

Figure 5:
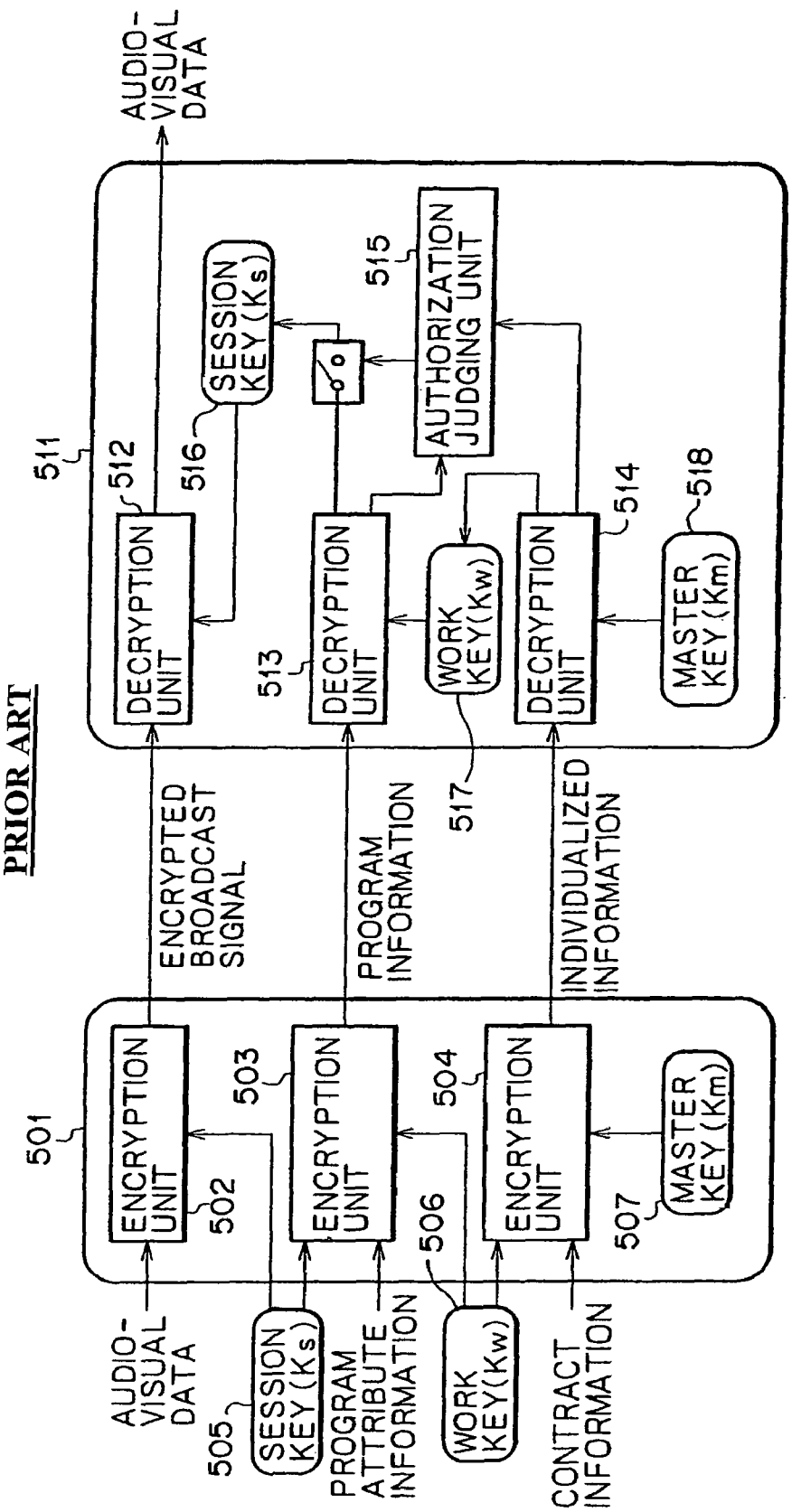
FIG. 5 is a schematic view showing how a data transmitter and a data receiver are constituted in the conventional data transmission system.

Below is a description of how data are encrypted by the data transmitter 2 using encryption keys and how encrypted data are decrypted by the data receiver 3 using the encryption keys (used as decryption keys). The data transmitter 2 and data receiver 3, constituted as shown in FIG. 8, are interconnected via the communication channels depicted in FIG. 6. The data transmitter 2 transmits data to the data receiver 3 in accordance with the first protocol (using the section). Data transmission according to the second protocol (using TS packets) has been explained above with reference to the conventional makeup in FIG. 5. A comparison of the inventive arrangement in FIG. 8 with the conventional setup in FIG. 5 shows that the embodiment operates on two key levels, i.e., a session key Ks 24 and a master key Km 25 for encryption and decryption by the data transmitter and data receiver, whereas the conventional setup relies on a three-key level scheme. A saving of one key level is achieved by the embodiment.

The session key Ks 24 is possessed by the data transmitter 2 and the data receiver 3 for data encryption and decryption under what is known as the common key cryptosystem. For differentiating purposes, the session key Ks possessed by the data receiver 3 is referred to as the session key Ks 34 hereunder.

Using the session key Ks 24, the data transmitter 2 encrypts data to be sent to a specific data receiver or receivers. The data receiver 3 decrypts encrypted data received using the session key Ks 34, thereby extracting meaningful information out of the decrypted data.

The session keys Ks 24 and 34 are updated at regular intervals, e.g., daily, by the hour or by the minute. Even if eavesdroppers happen to know the session key Ks 24 at a given point in time, they can tap the data only for a limited period of time authorized by the key. Updating of the session keys Ks will be discussed later in more detail.

The session key Ks 24 is used to encrypt the section data part shown in FIG. 7C in accordance with the Tripe-DES mentioned above.

The master key Km 25, like the session key Ks 24, is possessed by both the data transmitter 2 and the data receiver 3. Each data receiver (3A, 3B, 3C) is assigned its unique master key. For differentiating purposes, the master key Km held by the data receiver 3 is referred to as the master key Km 35 hereunder.

The master key Ks 25 is never transmitted between the data transmitter 2 and the data receiver 3. There is no occasion on which any master key would be placed onto the communication channels. The master key is an encryption key that should never be known by any means to any party except its owner.

The master key Km is used by the data transmitter 2 to encrypt the session key Ks before transmitting it to the data receiver 3 and by the data receiver 3 to decrypt the encrypted session key Ks received. More specifically, the data transmitter 2 encrypts the session key Ks 24 using the master key Km 25 and transmits the encrypted session key Ks 24 to the data receiver 3 in advance. On receiving the encrypted session key Ks 24, the data receiver 3 decrypts the received key using its own master key Km (so as to extract the session key Ks 34).

The session key Ks, having undergone encryption and then decryption based on the master key Km, is guarded against unscrupulous tapping by potential eavesdroppers during transmission from the data transmitter 2 to the data receiver 3.

Using the decrypted session key Ks, the data receiver 3 decrypts the transmitted data that have been encrypted by use of the session key Ks in question. The data receiver 3 extracts meaningful information out of the decrypted data.

The session key Ks is encrypted and decrypted using the master key Km in accordance with the Triple-DES. Alternatively, a public key cryptosystem may be adopted. The alternative system is advantageous in that unlike the encryption and decryption processes of data, those of keys by the system need not be carried out at a high speed and they also ensure security.

Unlike the session key Ks 24, the master key Km 25 is not updated over time.

Below is a description of how the session key Ks 24 is updated. It is the data transmitter 2 that actively updates the session key Ks 24. The session key Ks 24 encrypted by use of the master key Km 25 (called the encrypted session key Km (Ks) hereunder) is actively transmitted by the data transmitter 2 as well.

The use of the bidirectional communication channels 9 allows the data receiver 3 actively to request the session key Ks. In this manner, the individual data receivers 3a, 3b and 3c can obtain their needed session keys quickly and reliably from the data transmitter 3. Illustratively, fast and dependable acquisition of the session key Ks 24 is made possible through an active request for the key by the data receiver in such cases as where a new data receiver 3 is added to the data transmission system 1, where a data receiver 3 having been put out of service and recovered from a failure rejoins the system 1, or where a data receiver 3 has failed to receive the session key Ks correctly. The recovery from failure and the update of session keys Ks are managed by CA (Conditional Access) managing units 23 and 33 incorporated in the data transmitter 2 and the data receiver 3 respectively. The two units 23 and 33 communicate with each other to exchange control information therebetween.

The above feature makes it possible to overcome the third problem mentioned earlier, i.e., the inability of the data transmitter, in a data transmission system solely dependent on satellite links as communication channels, to know whether information has been correctly transmitted to destination data receivers.

The data transmitter 2 may transmit the session key Ks to the data receiver 3 either over the unidirectional satellite links 4a or over the bidirectional communication channels 9.

The session key Ks is updated in steps constituting a flowchart shown in FIG. 9.

At a given point in time, the data receiver 3 holds two session keys Ks 34, i.e., a session key Ks_even and a session key Ks_odd. The data receiver 3 uses one of the two session keys Ks_even and Ks_odd in decrypting information and data sent from the data transmitter 2.

Which of the two session keys Ks is currently used is identified by information written in the section header 103 depicted in FIG. 7D. For example, as shown in FIG. 10, the section header 103 comprises a table ID (table_id), a MAC address part (MAC_address_1, MAC_address_2, MAC_address_3, MAC_address_4, MAC_address_5, MAC_address_6), a section information part (section_length, section_number, last_section_number), ssi (section_syntax_indicator), pi (private_indicator), rsvd (reserved), psc (payload_scramble_indicator) 111, asc (address_scramble_indicator), LSf (LLC_SNAP_flag), and cni (current_next_indicator). The psc 111 indicates which of the two session keys Ks is currently in use. The psc 111 is illustratively made of two-bit information. If the psc high-order bit is "0," that means the session key Ks_even is being used; if the psc high-order bit is "1," that means the session key Ks_odd is now in use.

In step S1 of FIG. 9, a check is made to see which of the session keys Ks is currently used. In step S2, the data receiver 3 is triggered by a timer into initiating a session key updating process.

In step S3, the data receiver 3 updates the flag of the current session key Ks found in a correspondence table in which MAC addresses are retained in correspondence with session keys Ks. The data receiver 3 illustratively possesses a MAC-address-to-session-key correspondence table such as is shown in FIG. 11. A flag in the currently used session key Ks is updated with reference to the table. The update operation inverts the high-order bit of the psc 111 to, say, "0."

In step S4, the data receiver 3 decrypts the IP datagram included in the section on the basis of the psc 111. More specifically, if the psc high-order bit is set to "0," the data receiver 3 stops using the current session key Ks_odd (used when the psc high-order bit is "1") and switches to the session key Ks_even for decryption. If the psc high-order bit is set to "1," the data receiver 3' stops utilizing the current session key Ks_even (used when the psc high-order bit is "0") and switches to the session key Ks_odd for decryption.

In step S5 and before the session key Ks is changed anew, the data transmitter 2 encrypts the next session key Ks using the master key Km 24 and transmits the encrypted key to the data receiver 3.

The encrypted session key Km (Ks) is transmitted over either the satellite links 4a or the bidirectional communication channels 9. The protocol used for the transmission should be one which entails acknowledgments, such as the TCP/IP (Transmission Control Protocol/Internet Protocol). The protocol allows the session key Ks to be transmitted unfailingly from the data transmitter 2 to the data receiver 3.

In step S6 and while the session key transmission is under way, the data receiver 3 updates the MAC-address-to-session-key correspondence table shown in FIG. 11. That is, the currently used session key Ks is replaced by the next session key Ks.

In step S7, the data receiver 3 ascertains that the next session key Ks is now retained by the data receiver 3. In step S8, the data receiver 3 switches to the next session key Ks. Steps S8 through S13 constitute a process in which the psc high-order bit is set to "1" so that the session key Ks_odd is used for decryption. The process is reached either from step S7, or from step S1 if the data receiver 3 finds the current session key Ks to be the session key Ks_even (psc high-order bit: 0).

By carrying out the steps above, the data transmitter 2 feeds the data receiver 3 with session keys Ks that are updated reliably. The data receiver 3 switches its two session keys Ks instantaneously so that there will be no discontinuation of data decryption based on the currently effective session key Ks. The updating frequency of the session key Ks 24 may be varied flexibly depending on the duration of transmission processing.

The session key Ks is updated regularly inside the data receiver 3 as described above. Using the session key Ks thus updated, the data receiver 3 decrypts information and data which are sent in along with the key.

Described below are steps to be performed by the data transmitter 2 before sending data, and steps to be carried out by the data receiver 3 after receiving data. The steps that the data transmitter 2 performs before transmitting data are shown illustratively in a flowchart of FIG. 12. The steps to be conducted by the data receiver 3 upon receipt of data are indicated illustratively in a flowchart of FIG. 14.

In step S21 of FIG. 12, the data transmitter 2 receives an IP datagram to be sent to the data receiver 3 either from the transmitter 2 itself or from an interface that is connected to the bidirectional communication channels 9. The data transmitter 2 also receives information from an information center on the basis of access information from the Internet 6.

In step S22, the data transmitter 2 checks a destination address part of the IP datagram to know a destination address based on the first protocol. For example, the data transmitter 2 finds out the destination address of the data receiver 3 according to the first protocol by referring to an IP-address-to-MAC-address correspondence table such as one shown in FIG. 13, the table being retained by the data transmitter 2.

With the destination address thus found out, the data transmitter 2 creates a section in accordance with the destination address. At this point, the data transmitter 2 provides the data part with bit "1" padding as needed so that the data part will become a multiple of 64 bits.

In step S23, the data transmitter 2 extracts the currently used session key Ks 24 by checking a flag 112 of that key Ks in a MAC-address-to-session key correspondence table such as one shown in FIG. 11. Using the session key Ks thus extracted, the data transmitter 2 encrypts the data part of the section as shown in FIG. 7C. At this point, the data transmitter 2 checks the flag of the current session key Ks and sets the flag content to the high-order bit of the psc 111 in the session header shown in FIG. 11.

In step S24, the data transmitter 2 divides the entire section 109 into payload parts P of TS packets 106, 107 and 108 as shown in FIGS. 7E through 7G. The TS packets 106, 107 and 108 are supplemented with a predetermined PID each. The payload P is encrypted as required by the second protocol before being output onto the satellite links 4a.

The foregoing description has shown the steps in which the data transmitter 2 makes preparations prior to data transmission. The data transmitter 3, having received the data over the satellite links 4a, carries out the steps described below.

Figure 14:
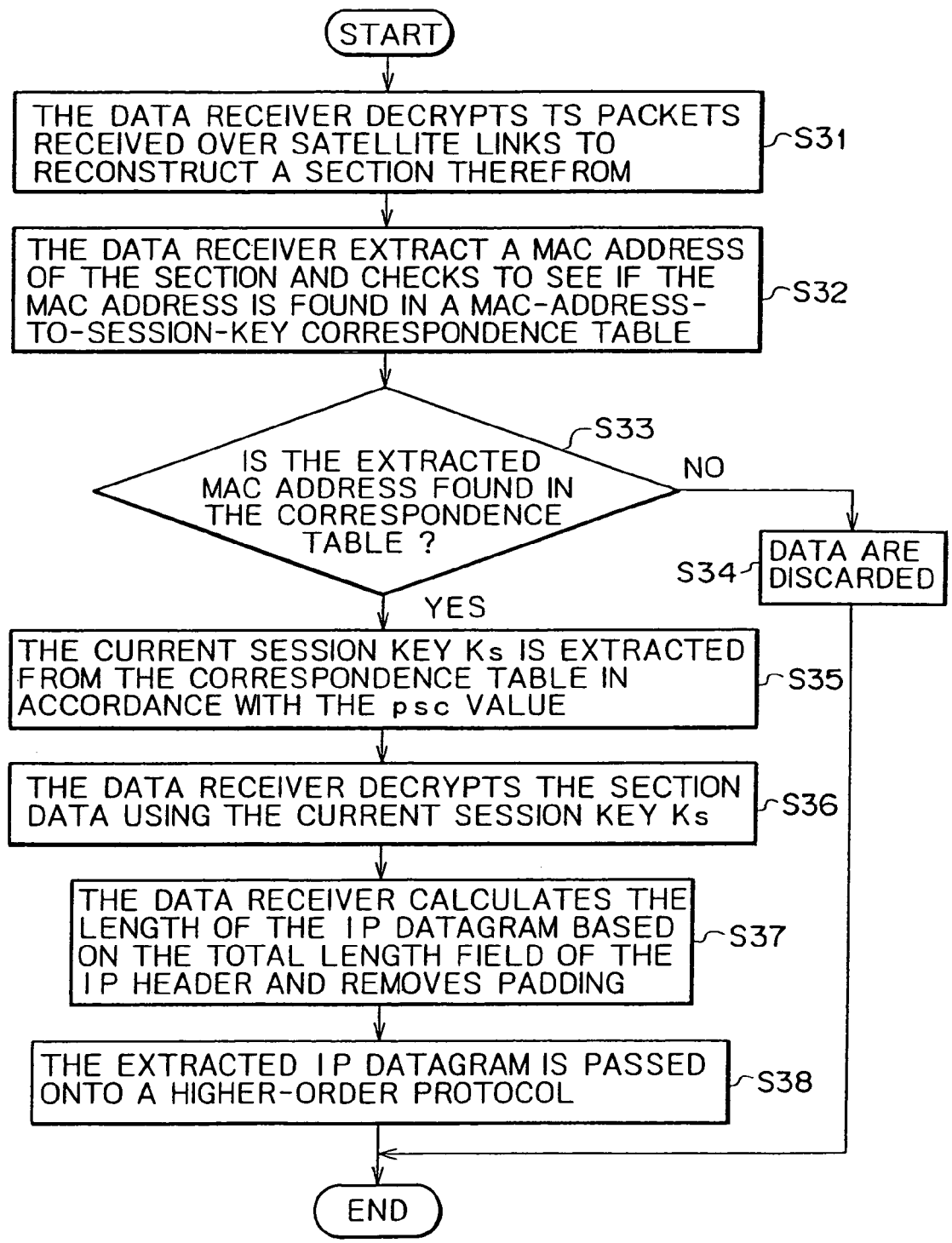
FIG. 14 is a flowchart of steps in which the data receiver decrypts received data using a session key Ks.

In step S31 of FIG. 14, the data receiver 3 decrypts the TS packets 106, 107 and 108 received over the satellite links 4a so as to reconstruct the entire section 109 therefrom.

In step S32, the data receiver 3 extracts the destination address (i.e., MAC address) of the section. In step S33, the data receiver 3 checks to see if the MAC address is found in a MAC-address-to-session-key correspondence table shown in FIG. 15. That is, a check is made to see if the section contains data that the data receiver 3 is authorized to receive. If no MAC address is found in step S33, the data receiver 3 goes to step S34 and discards the data. If a MAC address is detected, the data receiver 3 reaches step S35 in which the psc 111 shown in FIG. 10 is extracted from the section header 103. The data receiver 3 checks the high-order bit of the psc 111 to see which of the two session keys Ks is currently effective, and the effective session key Ks is selected.

In step S36, the data receiver 3 decrypts the section data 104 using the retrieved session key Ks in accordance with the Triple-DES. In step S37, the data receiver 3 extracts the IP datagram from the decrypted data. Illustratively, the data receiver 3 reads a total length field 113 (in FIG. 16) from the IP header prefixed to the decrypted data part, finds out the length of the IP datagram from the field 113, and extracts the entire IP datagram calculated accordingly. In the process, the excess padding attached upon encryption is removed so that the target IP datagram is extracted intact.

By carrying out the steps described above, the data transmitter 2 performs necessary processing prior to data transmission and the data receiver 3 conducts procedures associated with the received data. The data receiver 3 thus accepts the information and data that have been addressed thereto.

The data transmission system 1 constituted as described above is capable of resolving the conventionally experienced problems mentioned earlier.

Figure 17:
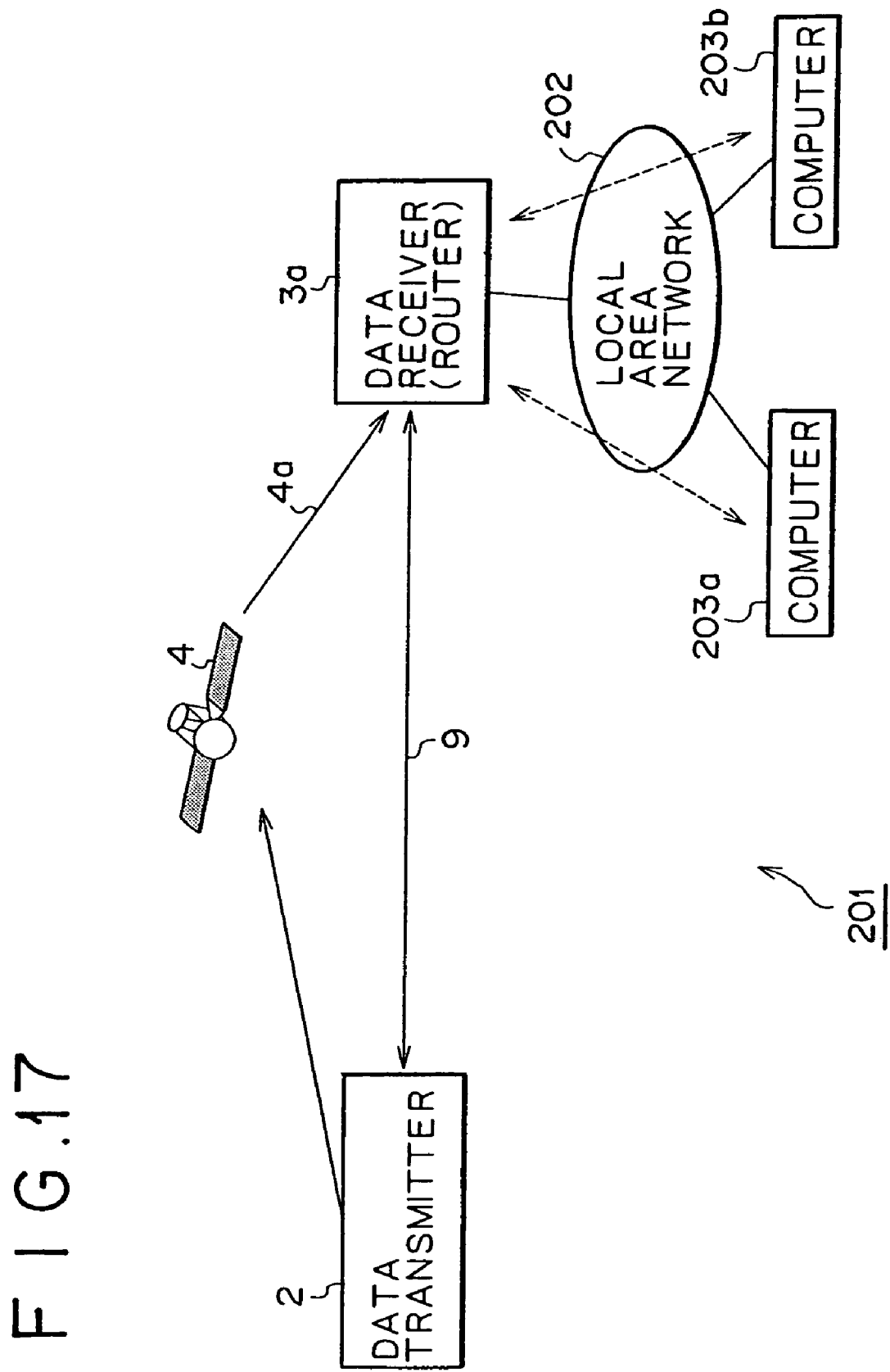
FIG. 17 is a schematic view of a first variation of the data transmission system.

Variations of the data transmission system 1 may be made alternatively. FIG. 17 shows a data transmission system 201, a first variation of the system 1. The data transmission system 201 is characterized in that the data receiver 3 is furnished as an IP router.

The data transmission system 1 is shown having the data receiver 3a receive IP datagrams directly. By contrast, the data transmission system 201 has its data receiver 3a structured as an IP router. This setup allows the data received by the data receiver 3a from the satellite links 4a to be transferred to computers 203a and 203b which are not interfaced to the satellite links 4a, the computers 203a and 203b being connected to the data receiver 3a over a local area network (LAN) 202 such as the Ethernet. In this case, the data transmitter 2 and the data receiver 3a may provide restrictive data reception control over not only the data receiver 3a but also all computers 203a and 203b on the local area network 202 connected to the data receiver 3a. More specifically, inside the correspondence table of FIG. 13 in which IP addresses of the data transmitter 2 are set in correspondence with section destination addresses (MAC addresses), individual IP addresses are replaced with IP network addresses each representing a set of a plurality of IP addresses. To effect restrictive data transmission control between the data receiver 3a on one hand and the computers 203a and 203b on the other hand requires implementing restrictive data transmission control measures at the level of either the IP protocol or of applications of higher orders. That is because data transmission in the data transmission system 201 is carried out over the satellite links 4a only.

Figure 18:
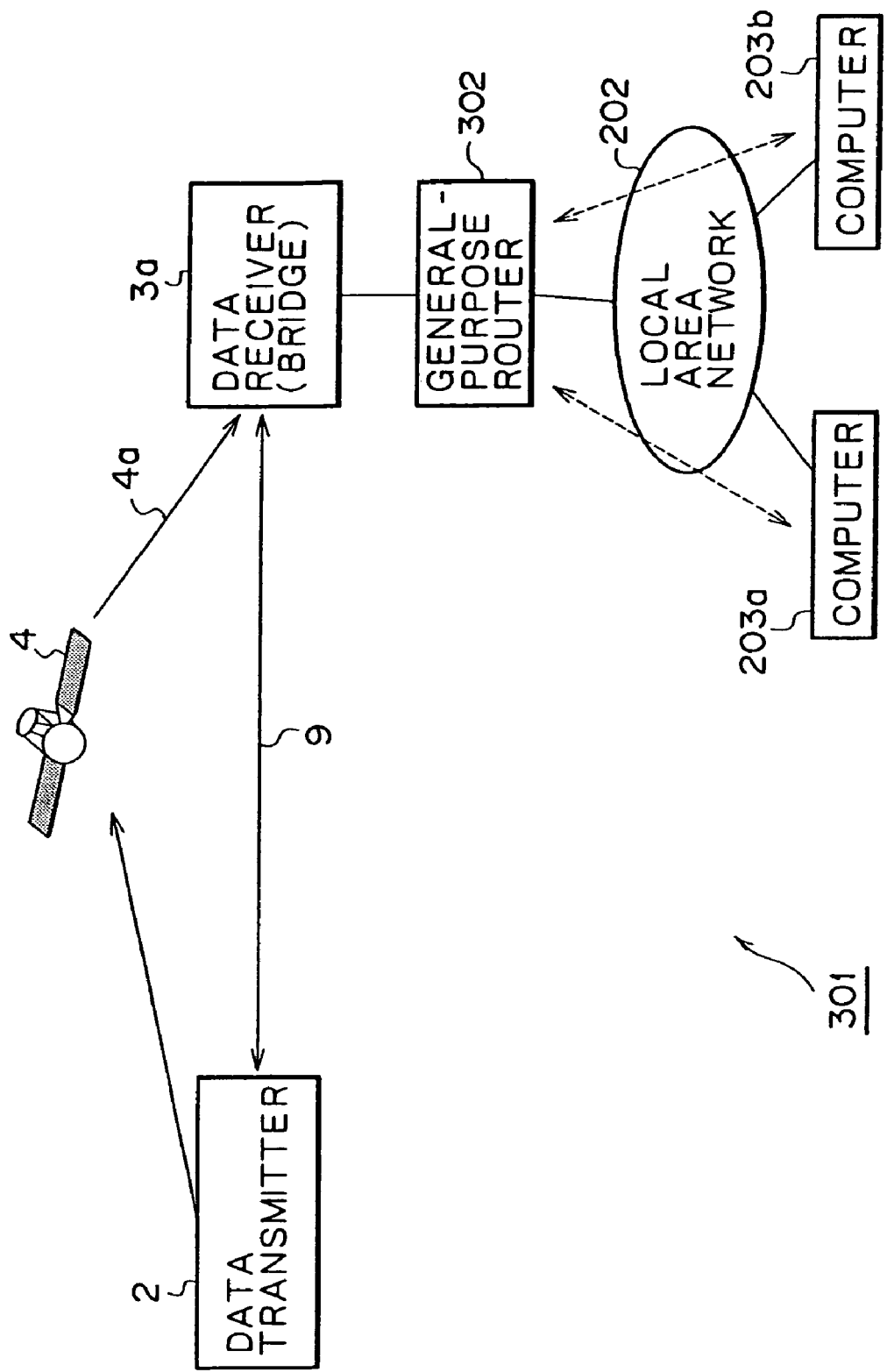
FIG. 18 is a schematic view of a second variation of the data transmission system.

A data transmission system 301, a second variation of the system 1, is sketched in FIG. 18. In the data transmission system 301, the data receiver 3a is structured as a bridge that solely performs protocol conversion in forwarding IP datagrams. The data transmission system 301 differs from the system 201 in that the system 301 does not conduct routing.

The data receiver 3a decrypts data received over the satellite links 4a to extract an IP datagram therefrom. The extracted IP datagram is placed in an Ethernet frame and transferred to a general-purpose router 302. In turn, the router 302 performs ordinary processing on the IP datagram. With no need to effect routing on its own, the data receiver 3a is structured simply and used in conjunction with a general-purpose router.

As many apparently different embodiments of this invention may be made without departing from the spirit and scope thereof, it is to be understood that the invention is not limited to the specific embodiments thereof except as defined in the appended claims.

What is claimed is:

1. A data transmission controlling method for controlling transmission of data from data transmitting means to data receiving means over communication channels and for causing said data transmitting means to encrypt data and transmit the encrypted data to said data receiving means over said communication channels, said data transmission controlling method comprising the steps of:

encapsulating the data, to be transmitted in multiplexed fashion and having a destination address, in accordance with a first protocol to create a section wherein the section is created based upon the destination address;

encrypting the section resulting from the encapsulation;

supplementing the encrypted section with a section header and a section trailer, wherein the section header included a MAC (media access control) header;

dividing the encrypted supplemented section into a plurality of payloads in accordance with a second protocol;

adding MPEG-2 transport stream headers to each payload to form packets for transmission; and transmitting the packets over satellite links, wherein the first encapsulating step is done before the encrypting step and the first protocol pads a portion of 0 to 63 bits with a corresponding "1" as a suffix to the data, thereby maintaining a predetermined data length.

2. A data transmission controlling method according to claim 1, wherein said encapsulating in accordance with said first protocol supplements a real data part including said data to be transmitted to said data receiving means with an additional information part associated with said real data part.

3. A data transmission controlling method according to claim 2, wherein said additional information part includes destination address information identifying the data receiving means authorized to receive data included in said real data part.

4. A data transmission controlling method according to claim 3, wherein said destination address information is either individual or group destination address information.

5. A data transmission controlling method according to claim 3, wherein said data transmitting means possesses session keys corresponding to said destination address information, said session keys being used by said data transmitting means to encrypt information and data and by said receiving means to decrypt the encrypted information and data received; and wherein said data transmitting means transmits in advance said session keys to the data receiving means authorized to receive the transmitted information and data in accordance with said destination address information.

6. A data transmission controlling method according to claim 5, wherein said session keys are updated at predetermined intervals.

7. A data transmission controlling method according to claim 5, wherein said session keys are transmitted over a communication channel permitting either unidirectional communication from said data transmitting means to said data receiving means or bidirectional communication therebetween.

8. A data transmission controlling method according to claim 2, wherein said encapsulating in accordance with said first protocol uniquely determines how said destination address information attached to said real data part is stored into said additional information part, said encrypting step further encrypting said real data part using a master key specific to the data receiving means corresponding to said destination address information.

9. A data transmission controlling method according to claim 3, wherein said additional information part provides a 48-bit space in which to accommodate said destination address information.

10. A data transmission controlling method according to claim 2, wherein the communication channel is in a broadcast data transmission system, including a satellite broadcast system, and said encapsulating in accordance with the first protocol encapsulates the data to be transmitted to said data receiving means in accordance with either the Internet protocol or the Ethernet protocol.

11. A data transmission controlling method according to claim 1, wherein said data receiving means is constituted as an IP router.

12. A data transmission controlling method according to claim 1, wherein said data receiving means is constituted as a bridge.

13. A data transmission controlling method according to claim 2, wherein said additional information part includes data to verify a communication channel.

14. A data transmission controlling method for controlling transmission of data from data transmitting means to data receiving means over communication channels and for causing said data transmitting means to encrypt data and transmit the encrypted data to said data receiving means over said communication channels, said data transmission controlling method comprising the steps of:

encapsulating the data, to be transmitted in multiplexed fashion and having a destination address, in accordance with a first protocol therein creating a section based upon the destination address, wherein the first protocol pads a portion of 0 to 63 bits with a corresponding "1" as a suffix to the data, thereby maintaining a predetermined data length;

encrypting the section using an encryption key;

supplementing the encrypted section with encryption key information about said encryption key, a section header and a section trailer, wherein the section header includes a MAC (media access control) header;

dividing the encrypted supplemented section into a plurality of payloads in accordance with a second protocol;

adding MPEG-2 transport stream headers to each payload to form packets;

transmitting said packets from said data transmitting means to said data receiving means by satellite links; and decrypting said packets using one of a plurality of decryption keys which allow said data receiving means to decrypt said encrypted data and which are updatable, said one of the decryption keys being selected in accordance with said encryption key information attached to said encrypted data.

15. A data transmission controlling method according to claim 14, wherein said plurality of decryption keys include a decryption key which is currently usable for decrypting said encrypted data received, and a decryption key which is to be used next to decrypt said encapsulated, encrypted data received; and wherein said data decrypting step selects the currently usable decryption key based on said encryption key information.

16. A data transmission controlling method according to claim 15, wherein said encryption key and said decryption keys are session keys for encrypting information and data.

17. A data transmission controlling method according to claim 16, wherein said session keys are updated at predetermined intervals.

18. A data transmission controlling method according to claim 14, wherein said data receiving means is constituted as an IP router.

19. A data transmission controlling method according to claim 14, wherein said data receiving means is constituted as a bridge.

20. A data transmission controlling method according to claim 14, wherein the supplemented data includes data to verify a communication channel.

* * * * *